United States Patent [19]

Horikiri et al.

[11] Patent Number: 4,519,679
[45] Date of Patent: May 28, 1985

[54] LIQUID CRYSTAL DISPLAY DEVICE

[75] Inventors: Kenji Horikiri; Fumio Ueda; Hiroaki Ideno, all of Hyogo, Japan

[73] Assignee: Mitsubishi Denki Kabushiki Kaisha, Tokyo, Japan

[21] Appl. No.: 422,978

[22] PCT Filed: Feb. 3, 1982

[86] PCT No.: PCT/JP82/00032

§ 371 Date: Sep. 8, 1982

§ 102(e) Date: Sep. 8, 1982

[87] PCT Pub. No.: WO82/02973

PCT Pub. Date: Sep. 2, 1982

[30] Foreign Application Priority Data

Feb. 3, 1981 [JP] Japan .................................. 56-15408
Feb. 27, 1981 [JP] Japan .................................. 56-28892

[51] Int. Cl.³ .................................................. G02F 1/13
[52] U.S. Cl. ......................... 350/339 R; 350/339 F; 350/345
[58] Field of Search ................ 350/339 F, 339 R, 345

[56] References Cited

U.S. PATENT DOCUMENTS 3,799,647 3/1974 Luft .
3,840,695 10/1974 Fischer ........................ 350/345 X
3,984,176 10/1976 Hirai et al. .................... 350/345 X
4,227,777 10/1980 Murakami .................... 350/339 F
4,371,870 2/1983 Biferno ........................ 350/345 X

FOREIGN PATENT DOCUMENTS 55-32100 of 1980 Japan .

OTHER PUBLICATIONS

"An Automotive Instrument Panel Employing Liquid Crystal Displays," Paper No. 770274, Int'l Automotive Engineering Congress and Exposition, Feb. 28–Mar. 4, 1977 of Society of Automotive Engineers.

Primary Examiner—John K. Corbin
Assistant Examiner—Richard F. Gallivan
Attorney, Agent, or Firm—Wenderoth, Lind & Ponack

[57] ABSTRACT

A liquid crystal display device which has a good legibility and is easily produced has a first and a second polarizer with a TN type liquid crystal display element therebetween, the optical axes of the two polarizers being parallel to each other. A color filter is arranged to be in contact with either one of those polarizers and a transflector is arranged so as to be in contact with the color filter, the arrangement being such that the illumination of light is effected through the transflector.

5 Claims, 11 Drawing Figures

LIQUID CRYSTAL DISPLAY DEVICE

BACKGROUND OF THE INVENTION

1. Field of the Invention

This invention relates to a liquid crystal display device, and more particularly to a liquid crystal display device in which the legibility and a liquid crystal display element are more easily made by combining the filter for displaying in color, a display unit and plates for effecting the transflection of light with one another.

2. Description of the Prior Art

Liquid crystal display devices are composed of the liquid crystal display element and polarizer, the liquid crystal display element having a liquid crystal material sandwiched between two glass plates. Those two glass plates are thinly coated with transparent electrodes. If a voltage used as a displaying signal, is applied across those electrodes, then the optical axis of the liquid crystal material has the property that it becomes parallel to an electric field generated by that voltage. Also in the absence of an electrical signal, the optical axis of the liquid crystal material is parallel to the two transparent electrodes and its axial direction is twisted just through 90 degrees between the two electrodes. Such a liquid crystal display element is normally called a TN(Twisted Nematic) type liquid crystal. By providing polarizers outside of said two glass plates, light can only transmit through (or be intercepted by), those display pattern portions desired to effect the display.

The liquid crystal display device is possible to effect various displays for the reasons that the transmission or interception of light is selectively effected and still with an external electrical signal. Since the legibility of a pattern to be displayed is due to external light, it is called a light receiving type display element. The light receiving type display element requires necessarily external light. To this end, the display element is used by disposing an illuminant adjacent thereto or by effectively utilizing surrounding light. With reference to conventional examples shown in FIG. 1 through FIG. 3, the respective operations thereof will be described hereinafter. FIG. 1 is a sectional view illustrating the passage of light with a liquid crystal display device used in the reflection mode. (1) is a liquid crystal display element, (2) and (3) are polarizers, and (4) is a reflector from which light is well reflected. Upon incident light $L_1$ falling on the polarizer (2), that portion of light capable of passing therethrough has only a constant component of polarized light while the other component of polarized light is absorbed by the polarizer (2). Light passed through this polarizer (2) travels while it retains its direction of polarization identical to the optical axis of the liquid crystal in the process in which it passes through the liquid crystal display element (1) and on that portion of the liquid crystal not applied with an electric field. In the TN type liquid crystal, the optical axis of the liquid crystal is twisted just through 90 degrees between the two electrodes. Thus, when light incident upon the liquid crystal display element (1) leaves the latter, it changes to light having a direction of polarization twisted through 90 degrees with respect to the incident light. Assuming now that the polarizer (3) has an absorption axis orthogonal to that of the polarizer (2), the abovementioned incident light $L_1$ passes through the polarizer (3) as it is left intact and reaches the reflector (4). Light reflected from the reflector (4) again passes through the polarizer (3), the liquid crystal display element (1) and the polarizer (2) and can be observed as reflected light $L_2$ resulting in our eyes viewing the surface of the reflector (4) as being light. With an electric field applied to the liquid crystal display element (1), that portion of the liquid crystal having the electric field existing thereon has the optical axis parallel to the electric field. That is, the optical axis of the liquid crystal changes from its state in which it is parallel to the transparent electrodes to its direction perpendicular thereto. At that time when the incident light $L_1$ passes through the liquid crystal display element (1), the same reaches the polarizer (3) with its direction of polarization remaining intact as it has left the polarizer (2) but not affected by the liquid crystal. Since the polarizers (2) and (3) have the absorption axes orthogonal to each other as described above, the incident light $L_1$ is nearly absorbed by the polarizer (3) and does not reach the reflector (4). Of course, our eyes can view nothing and that portion of the liquid crystal display element (1) applied with an electrical signal is viewed as being black in contrast to the background formed of bright light from the reflector (4). Thus, a displayed pattern can be visually recognized. The foregoing has been described in conjunction with the polarizers (2) and (3) orthogonal to each other but, with the absorption axes of the polarizers (2) and (3) parallel to each other, the background is black and a displayed pattern is light which is reversed from the foregoing.

FIG. 2 is a section view of a liquid crystal display device in the transmission mode in which the reflector (4) in FIG. 1 is omitted. By controlling a transmission of the incident light $L_3$ from a light source (5) in the liquid crystal display element (1) and viewing transmitted light $L_4$, it is possible to visually recognize a displayed pattern according to the principles quite identical to those described for FIG. 1. In this case, a display can be visually recognized even in the absence of external light. This is because the light source (5) is included in the device.

FIG. 3 is a sectional view of a liquid crystal display device in the transflective mode having the features of both the reflection mode of FIG. 1 and the transmission mode of FIG. 2. (6) is a transflective plate which may be composed of what utilizes the diffuse refection caused from the surface scattering as in cloth, light diffusing paper, milkwhite resins, etc, and the diffuse transmission due to the fact that light propagates through a material while effecting the multiple scattering, or what includes a diffuse reflecting surface somewhat transmitting light such as a light transmissive material with a scattering surface coated with a thin metallic film, etc.

Such display devices have merit in that the legibility can be maintained well regardless of a quantity of external light. This is because the display devices are put in the reflection mode utilizing the incident light $L_1$ for strong external light and in the transmission mode utilizing the transmitted light $L_3$ from the light source (5) for weak external light. This transflective mode is widely employed as having both the advantages of light emitting type display devices and those of light receiving type display devices which are opposite to the former devices in position concerning whether the legibility is good or bad with respect to an intensity of external light.

However although liquid crystal display devices utilize the polarization of light, it is not comparatively discussed as an important factor that the circumference of the liquid crystal display element, and more particularly any reflector other than the polarizer changes a degree of polarization. Especially in the reflection mode, a cause results for which the quality of displays decreases unless there is considered the fact that, because the liquid crystal display element transmits light twice, the degree of polarization reduces on the reflecting plate.

In the information society, however, the importance of information display rises increasingly and it can not be said that complicated information is viewed more accurately and correctly. One of things to be aimed at in the future is to improve the legibility resulting from color displays and the other thereof is to increase a contrast ratio of a displayed pattern.

For an increase in pieces of display information, a large-scaled liquid crystal display element may be used thereby to utilize a multitude of coloring matters. For example, as shown in FIG. 4, (1) is a liquid crystal display element, (2) and (3) are polarizers respectively and portions enclosed with dotted line are display portions (7A) through (7D).

In the reflection mode and the transmission mode as described above, the polarizers (2) and (3) are affixed to the entire front and rear surfaces of the liquid crystal display element (1), one for each of the front and rear surfaces. Thus, with color displays effected, it is possible to use a color polarizer but only a single color can be expressed.

In order to solve this disadvantage, there is first proposed a liquid crystal display device shown in FIG. 5. A difference between that device and the conventional device shown in FIG. 4 is to affix color polarizers (2A), (2AA), (2B), (2C), (2CC) and (2D) in splits along the liquid crystal display portions (7A) through (7D) in place of the polarizer (2). (8) are border lines between the polarizer (2A) and the polarizer (2AA), between the polarizer (2C) and the polarizer (2CC), between the polarizer (2C) and the polarizer display portions (7) is good for the liquid crystal display portion (7B) of a simple pattern.

By affixing the general color polarizers along the liquid crystal display portions (7) in this way for the polarizer (2), the disadvantages resulting from the embodiment of FIG. 4 can be solved. However, the operation of affixing the polarizer (2) having several kinds (several colors) along the liquid crystal display portion (7) is only good for the liquid crystal display portion (7B) of a simple pattern. For example, with the liquid crystal display portions (7C) and (7D) having curve portions or with a complicated pattern displayed in color by the liquid crystal display, it is difficult to perform the operation of affixing several kinds of polarizers (2) with a high accuracy resulting in a reduction in productivity (i.e. manufacturing yield).

Presently color polarizers are red, green, blue, orange and yellow and have many problems. Thus, they are not widely used with practical display devices. One of the problems is that their color tones are restricted so that color tones suitable for various displays can not be obtained. Another problem is that color polarizers have contrast ratios which are particularly bad as compared with neutral polarizers, resulting in the deterioration of the legibility. Also it can not be said that the reliability is not sufficient in relation to the stability of coloring material. Due to those disadvantages, they have not been utilized with liquid crystal display devices in comparison with their being widely utilized with other display devices in which the color display has better legibility. Particularly, the orange and yellow colors do not reach the practical level.

SUMMARY OF THE INVENTION

The present invention makes it possible to effect any color display by using a color filter in place of a color polarizer and also for its object aims at the provision of a liquid crystal display device for effecting the color display higher in legibility and which device is high in contrast ratio, by paying attention to changes in degree and state of polarization of a color filter, as well as a reflector, and a transflector.

According to the present invention, the liquid crystal display device is constructed by considering the color filter and state of polarization of light. Thus, there are the effect that a display device is provided which is enabled to effect various color displays and good in contrast ratio.

The display device has been constructed so that a front panel thereof is divided into a lighshading print unit and a printed portion for scale and units, characters, numerals etc. and the device is divided into two parts or a background plate rendered a display unit transparent and the front panel printed with the scale and units, the characters, etc. while illuminating light is incident upon the front panel through the end surface thereof. Thus, the manufacturing productivity is improved while the liquid crystal display device can be made so that the coloring of the display unit, a color tone of the background, etc. can be selected at will resulting in the legibility.

BRIEF DESCRIPTION OF THE DRAWINGS

FIG. 6 is a sectional view of one embodiment of the present invention. In the FIG. (9) is a color filter for causing the display device to effect the color display. This example is put in the reflection mode but even with the reflector (4) substituted for the transflector (6), a line of thinking and the principles remain quite unchanged. The color filter (9) has a transmissive coating material printed and coated on a transparent film and its pattern identical to or somewhat larger than that of the transparent electrode on the liquid crystal display element (1). With the absorption axes of the polarizers (2) and (3) parallel to each other, incident light $L_1$ entering the liquid crystal display device is intercepted in the absence of an electrical signal or by a portion including no transparent electrode to effect no display. Thus, reflected light $L_2$ is absent to make the display device black and one can not observe the color of the color filter. Upon the application of an electrical signal to one transparent electrode a display pattern unit thereof transmits light. Thus the incident light $L_1$ passes through the color filter (9), and is reflected from the reflector (3). It passes again through the color filter (6), the polarizers (2) and (3) and the liquid crystal display element (1) resulting in the observation of reflected light $L_2$. A color displayed at that time is determined by the filtering characteristics of the color filter (9) and its color tone and hue are determined by the type of the coating material used with the filter and a coating thickness thereof. The color filter used here is satisfied by what is widely employed with self-illuminating display devices generally marketed. By utilizing the existing printing techniques in this way, polychromic printing is possible to be effected in register with the display pattern of the transparent electrode and a change in color, a color tone and a density of color can be varied at will. This not only increases the legibility of the liquid crystal display device and the display effect thereof but also can effect the color display without the necessity of affixing several kinds of polarizers in accurate register with the transparent electrode on the liquid crystal display element (11) as in the color display by the polarizers (2) and (3) and without the necessity of cutting the polarizer into complicated shapes.

FIG. 7 is a perspective view of another embodiment of the present invention in which a transflective plate (6) is provided in place of reflector (4). That embodiment is enabled to effect color displays in the transmission and reflection modes. As one problem, however, there exists inevitably the disadvantage that, with the absorption axes of the polarizers (2) and (3) orthogonal to each other, the color pattern of the color filter (9) is observed on the background.

Figure 1:
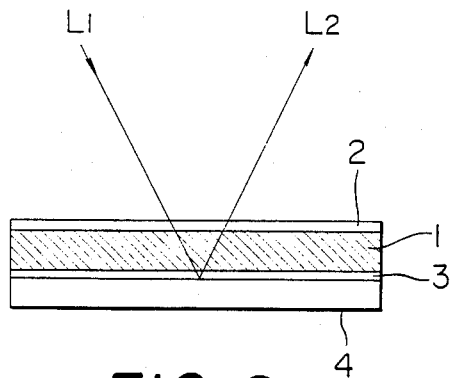
FIG. 1 is a sectional view of a conventional liquid crystal display device in the reflection mode.
Figure 2:
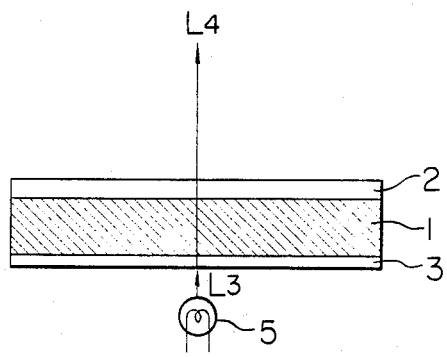
FIG. 2 is a sectional view of a conventional liquid crystal display device in the transmission mode.
Figure 3:
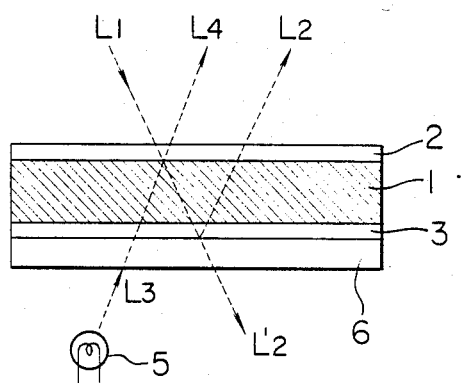
FIG. 3 is a sectional view of a conventional liquid crystal display device in the transflective mode.

A liquid crystal display device having good contrast will now be considered rather than the description in terms of changes in degree and state of polarization of light on the display device. The liquid crystal display device of FIG. 7 uses two polarizers (2) and (3) the absorption axes of which are parallel to each other. (The absorption axis of the polarizer (2) is shown by ⟵⟶ and that of the polarizer (3) is shown by ⟵⟶. Thus in the lighted state, the polarizer (2) transmits only a linearly polarized component of incident light $L_1$ orthogonal to the absorption axis thereof. That light passes through the color filter (9) and is reflected from the reflector (4) after which it passes again through the color filter (9) and enters the polarizer (3). Meanwhile, the light must be always maintained in the same polarized state as it has left the polarizer (3). If the polarized state is changed in the abovementioned process to cause a polarized component in the direction of the absorption axis of the polarizer (3) then it is strongly absorbed by the polarizer (3). This results not only in the incurrence of a reduction in brightness of the entire display surface but also in the adverse influence upon the constrast ratio. Among films forming base materials for the color filter (9), the regularity may be caused in the molecular array in the film forming process resulting in the presentation of an optical anisotropy. When such a material transmits light, linearly polarized light changes generally to elliptically polarized light which results in causes for which the brightness is reduced and the contrast ratio id deteriorated as described above. Also, where a diffused reflecting material attributing to the multiple scattering such as diffuse paper is used as the transflector (6), diffused, reflected light loses a memory of incident light resulting in an unpolarized state. Accordingly, one part of reflected light is absorbed by the polarizer (3), resulting in a reduction in the display performance similar to the foregoing.

As described above, the liquid crystal display element and the polarizing plate transmit light twice in the reflecting mode. Thus, in view of increasing the contrast ratio, it is the important condition that the first and second transmissions maintain the same polarized state.

Figure 8:
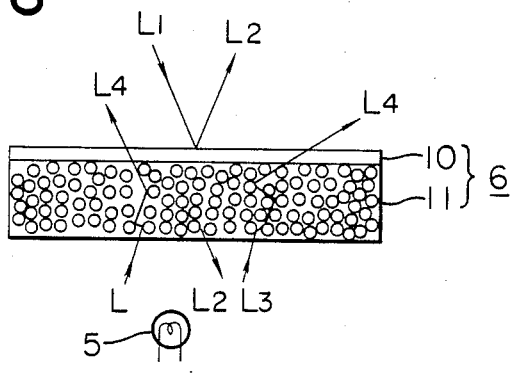
FIG. 8 is a sectional view of one embodiment of the transflective plate applied to the present invention.

FIG. 8 is a sectional view of one embodiment of the transflector (6) sufficiently satisfying the abovementioned effect and serving to carry out the present invention. (11) is a diffusion member and (10) is a semi-transmissive film which comprises a metal thin film coated on the surface of the diffusion member (10). The film is somewhat transmissive, and optically isotropic and causes reflected light $L_2$ and incident light $L_1$ to be maintained in the same polarized state as much as possible. Incident light $L_3$ from the light source (5) incident on this semi-transmissive film (6) is scattered and diffused by the diffusion member (11) and passed through the transmissive film (10) from which it emerges as transmitted light $L_4$. Therefore, the light $L_3$ incident from the light source (5) has a strong directivity and when having emerged from the transmissive film (10), the light forms uniform transmitted light $L_4$ even though the incident light $L_3$ entering the transflector (6) at every point would have a profile of brightness. Thus, the liquid crystal display pattern can be uniformly illuminated.

Figure 7:
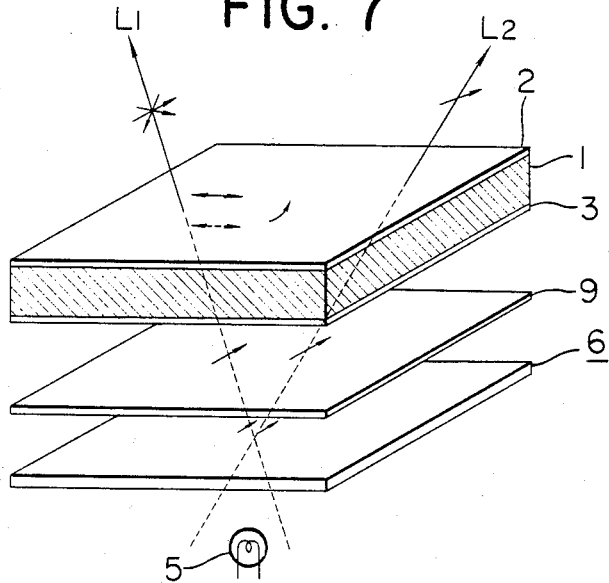
FIG. 7 is a perspective view of another embodiment of the present invention.
Figure 9:
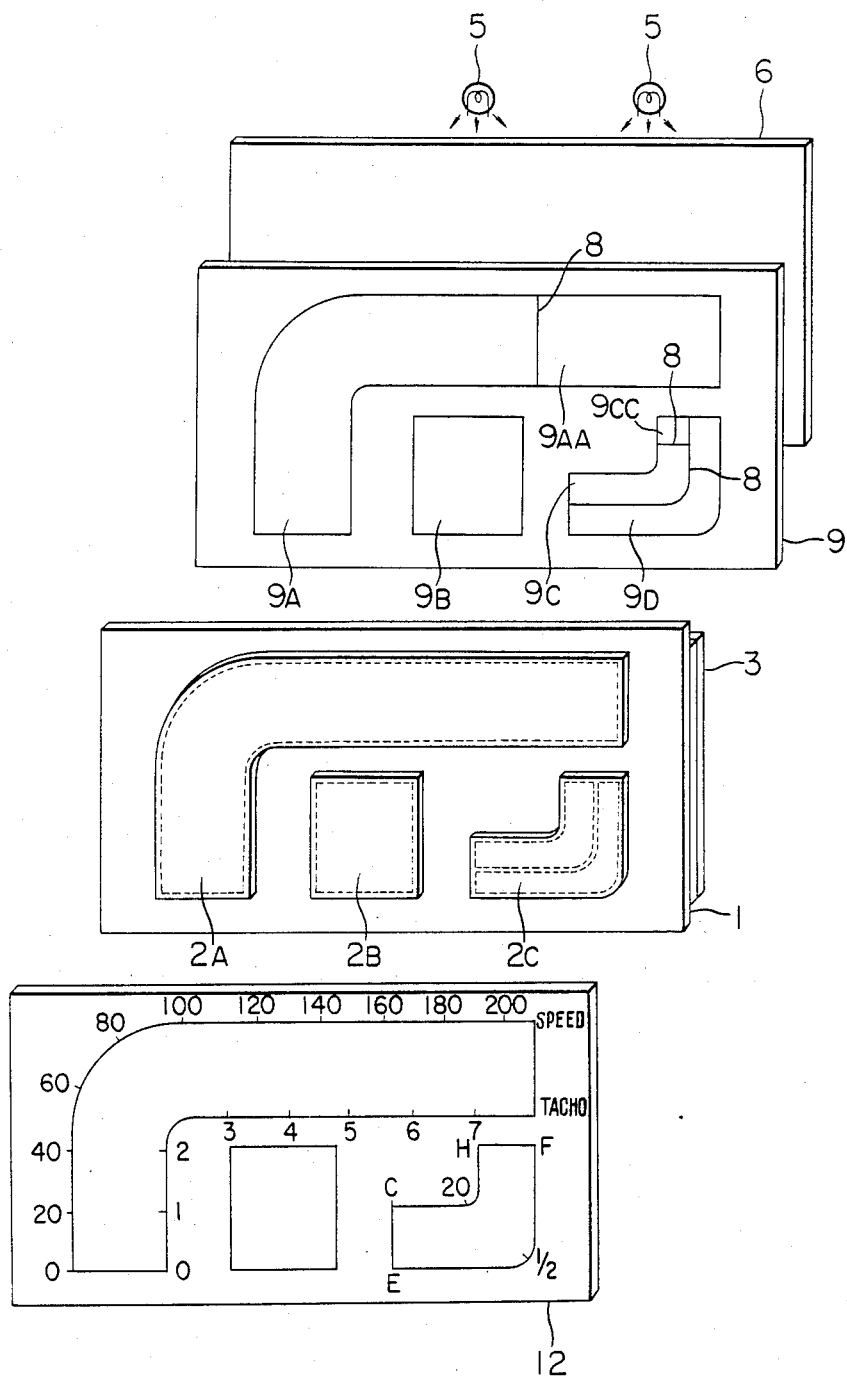
FIG. 9 is an exploded perspective view illustrating the construction of the liquid crystal display device of the present invention.

FIG. 9 is what is further improved in the device shown in FIGS. 7 and 8. In the FIG. (5) are light sources, (6) a transflector for scattering and reflecting light, and (9) is a color filter consisting of a thin transparent film which includes colored portions (9A) through (9D) printed or coated thereon with colored transmissive inks to substantially coincide in pattern with the liquid crystal display portions (7A) through (7D) as well as the polarizer (2).

Figure 5:
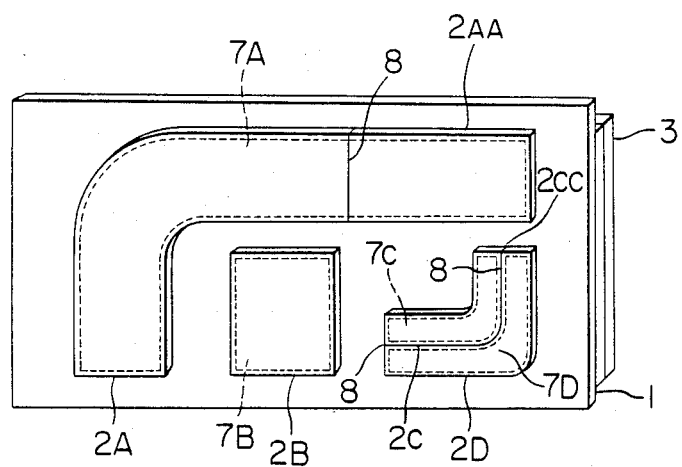
FIG. 5 is a perspective view of a modified conventional liquid crystal display device.
Figure 6:
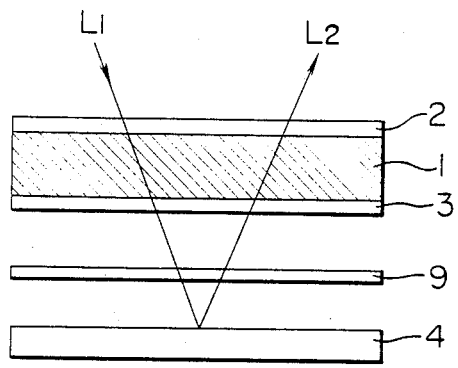
FIG. 6 is a sectional view of one embodiment of the present invention.

The polarizer (2) is affixed to the front surface of the liquid crystal display element (1) so that cut portions thereof do so in register with the liquid crystal display portions (7A) through (7B) but unlike the device of FIG. 5, it is not necessary for polarizer (2) to comprise the color polarizers (2A) through (2D) and will suffice so long as it comprises a neutral polarizer. Thus, it is not necessary to affix various polarizers at precise and accurate positions on the border lines where the display of colors is changed. The complicated color display is possible to be effected by colored portions of the color filter printed and coated on the color filter (9). Also, an accurate and fine pattern can readily be realized by using a printing technique such as silkscreening or the like.

This liquid crystal display element is provided on the front surface with a front panel (12). The front panel (12) is of a transparent resin, for example, an acrylic plate, a polycarbonate plate or the like applied with light shading printing except for those portions thereof corresponding to the liquid crystal display portions with one part of scales and units, numerals, characters, etc. applied with a semitransmissive printing. If the portions bearing the semitransmissive printing are particularly added with a paint strong in its light scattering ability then the legibility is improved with the utilization of external light.

In order to illuminate the scales and units, numerals, characters, etc. on the front panel (12) from an internal light source (5), the polarizer (2) is cut so as to be registered with the shape of the liquid crystal display portions. When doing so, light always passes through the liquid crystal display element (1) except for the liquid crystal display portions. The application of the light shading printing to the front panel (12) except for the liquid crystal display portions is to intercept light which does not contribute to the illumination of the scales and units, numerals, characters, etc.

In the liquid crystal display device thus constructed, the color display can be effected by the filter and furthermore it is required only to use a neutral polarizer (or a single kind of a polarizer) and cut it to be registered with the outer profile of the display pattern followed by the affixing thereof. In addition, good visual recognition is obtained with both the utilization of external light and the relying upon the internal light source. This is because the transflector (6) is used.

Figure 4:
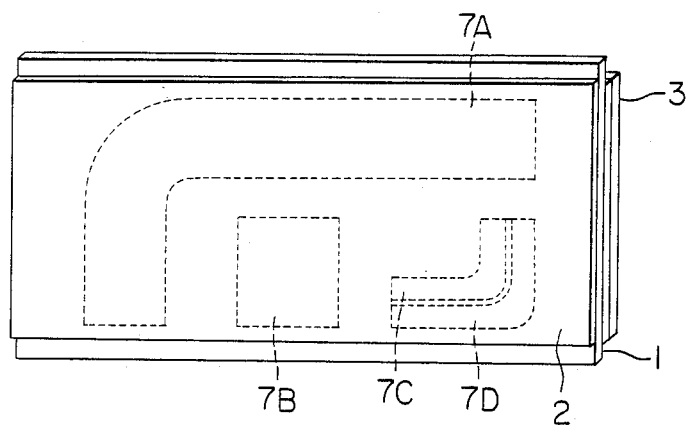
FIG. 4 is a perspective view of a conventional liquid crystal display device.

This display device substantially eliminates the disadvantages of the conventional devices shown in FIGS. 4 and 5, but there are still left problems concerning the cutting and positioning of the polarizer. Thus further improvements have been desired.

The present invention eliminates difficulties such as described above and for its object aims at the provision of a liquid crystal display device enabled to effect the color display without the necessity of cutting the polarizer and still making it possible to illuminate the display on the front panel thereby to enhance the legibility.

Figure 10:
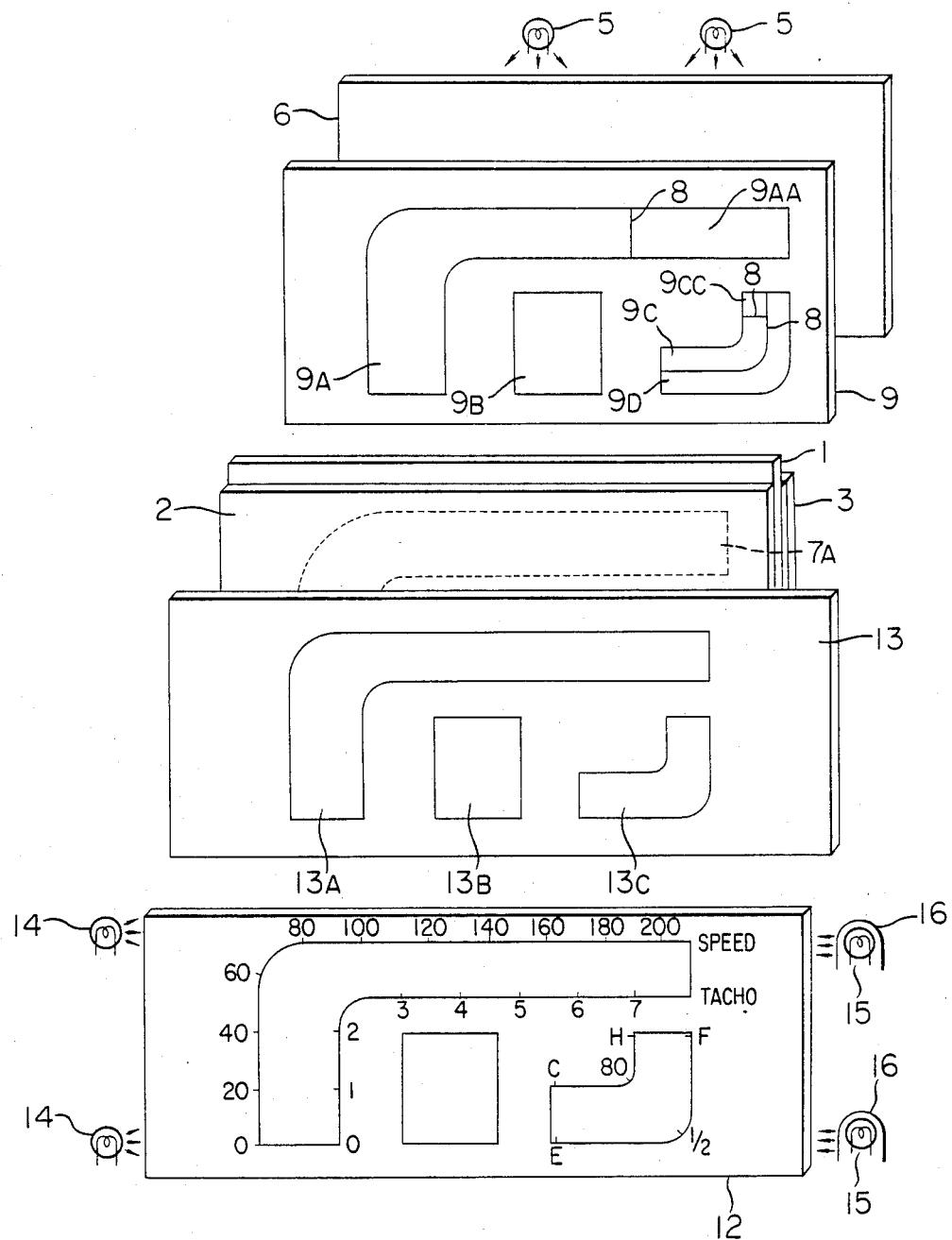
FIG. 10 is an exploded perspective view of another embodiment of the present invention.

Another embodiment of the present invention will be described hereinafter in conjunction with the Figures. In FIG. 10 (1) through (12) are the same as in FIGS. 1 through 9. (13) is a background plate which is provided on those portions corresponding to the liquid crystal display portions (7A) through (7D) with windows (13A), (13B), and (13C) to render those portions transparent. Other portions are colored or coated with a coating material so as to be opaque. Its color will suffice so long as the color causes the characters, the scales and units, numerals, etc. to be easily read, also the liquid crystal display portions (7A) through (7D) to be well legible, and is harmonized in view of the design. A material for the background plate (12) is formed of an acrylic plate, an aluminum plate, a glass plate, etc. and those portions thereof through which the liquid crystal display portions (7A) through (7D) are viewed are required to remain transparent or have the cut-off windows formed thereon. Also, only the scales and units, the characters, the numerals, etc. are printed or coated on the front panel (12). Light sources (14) and (15) such as lamps or the like are disposed on the front panel at both lateral ends or the upper and lower ends and the light source (15) is inserted in a cap (16) acting as a color filter. The polarizers (2) and (3) are affixed to the entire areas of both surfaces of the liquid crystal display element (1) which is of the quite same construction as the device of FIG. 4.

Subsequently the operation of FIG. 10 will be described. Light from the light source (5) is diffused by and transmitted through the transflector (6) and reaches the color filter (6). The liquid crystal display pattern is formed so as to be registered with this colored pattern and the two polarizers (2) and (3) are affixed to the entire surface of the glass plate on the display liquid crystal display element (1) so that their absorption axes for light are parallel to each other. Accordingly, when having been lit, the liquid crystal display components (7A) through (7D) on the liquid crystal cell (1) can transmit light from the light source (5). A color displayed at that time is determined by a color of that ink coated on the color filter (9). Light from the lit display portion passes through the transparent portions (13A), (13B) and (13C) of the background plate (13) and further can be visually recognized through the front panel (12). But the scales and units, the characters, the numerals on the front panel (12) can not be visually recognized with light from the light source (5). The reasons for this are that the polarizer (2) is affixed to the entire surface of the liquid crystal display element (1) and further shielded by the background plate (13).

However, light is incident upon the front panel (12) from the light sources (14) and (15) disposed at both lateral ends or the upper and lower ends of the front panel (12) to illuminate a plate with scales and unit on the front panel (12). Thus, the display characters and others can be definitely visually recognized.

Still, the front panel (12) in this embodiment has printed and coated on one side of the transparent plate only the plate with scales and units, the characters and the numerals required for the display while including the other portions put in transparent state and having the surface rendered smooth. This permits the illumination of the entire surface with a small difference between light and darkness. The principles thereof will be described thereinafter in conjunction with FIG. 11.

Figure 11:
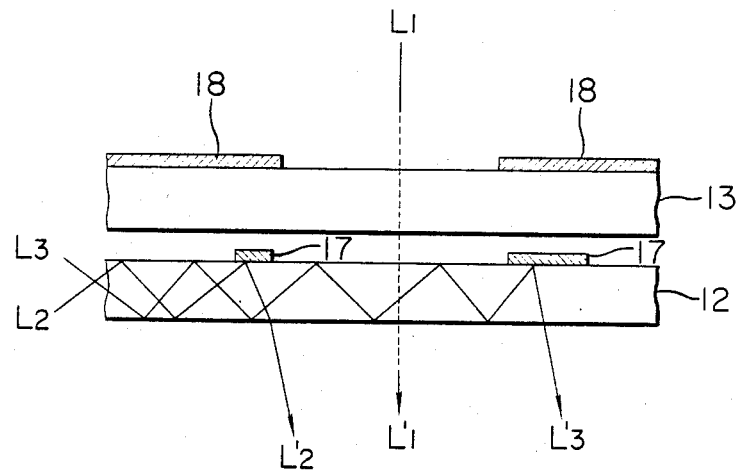
FIG. 11 is an enlarged sectional view of one part of the background plate and front panel in that embodiment.

FIG. 11 is an enlarged sectional view of one part of the sectional view of the front panel (12) and background plate (13) in FIG. 10. It is now assumed that light $L_2$ and $L_3$ from the light source (14) has been incident upon the front panel (12) through the end surface thereof. The light $L_2$ and $L_3$ travels through the front panel 12 while being totally reflected therein. In that process the light is scarcely attenuated. However, when the light from the light source (14) reaches that place of the surface of the front panel (12) on which an ink (17) exist to print and coat the plate with scales and units, the characters, the numerals, etc. thereon, the light is not totally reflected from the surface of the front panel (12) but it is partly entered into the coated ink portion to be scattered or diffused by the surface of the ink and a portion thereof is absorbed. However, if the ink is reflective, then a portion of the reflected light is again entered into the front panel (12). Due to an incident angle at that time, what is within the critical angle can not remain within the front panel and has emerged on the front surface which enters the eyes of the viewer's eyes as $L_2'$ or $L_3'$. That is to say, for a small area of the ink (17), the light incident from the light source B(14) travels through the front panel (12) without any attenuation and only one part of the light is scattered and diffused until it emerges on the front surface. This results in the illumination of the enter surface. This results in the illumination of the enter surface of the front panel (12) with a uniform brightness.

Also the effect is greater with a some clearance maintained between the background plate (13) and the front panel (12). When the two are put in completely intimate contact, the $L_2$ and $L_3$ are entered into the background plate (13) and scattered and diffused by the ink (18)

coated on one side of the background plate (13) until it is attenuated. Thus, the effect of the present invention is greatly deteriorated but it is not required to particularly devise a countermeasure because the ink (17) does not results in the intimate contact.

Also it is possible to select a color scheme for the ink (18) in order to hide eyesores other than the liquid crystal display portions (7) upon viewing the display device, and also so as to increase the ligibility of the display device having a color different from that of the polarizer (2) and to improve the quality of the display.

Where the plate with scales and units, the numerals and the characters on the front panel (12) are caused to change in color, that plate with scale and units can be displayed in color by varying the color of the ink (17). However this case has the disadvantage that it is restricted to a color coated once. Accordingly, the graduated plate with scales and units, the characters and the numerals can vary in color by rendering the color of the ink (17) while selecting and lighting either one of the light source (14) and the light source (15) with the cap (16) for the color filter.

While in the abovementioned embodiment the polarizer (2) has been described in terms of the neutral polarizer, the effect of the display as a whole may be improved by using a single color polarizer to bring out its color on the background througout the display.

We claim:

1. A liquid crystal display device comprising: a TN type liquid crystal display element having a plurality of liquid crystal display patterns formed thereon; a front panel having semi-transparent ink portions aiding the recognition of display contents and a plurality of transparent portions identical in shape to said liquid crystal display patterns on a surface of a transparent substrate respectively, said front panel being provided on the remaining portions with a light shielding print; a first polarizer and a second polarizer which are arranged such that said display element is between and in contact with said polarizers and which have their optical axes parallel to each other, said first polarizer being formed of a plurality of polarizing plates identical in shape to and somewhat larger in size than said liquid crystal display patterns respectively and disposed on one side of said display elements, said polarizing plates being identical to or somewhat larger in size than said transparent portions on said front panel, said second polarizer being disposed on the entire area of another side of said display element; a color filter disposed in contact with said second polarizer, said color filter including a plurality of color filter portions identical in shape to said liquid crystal display patterns respectively; a transflector disposed in contact with said color filter; and a light source disposed to effect the illumination through said transflector.

2. A liquid crystal display device as claimed in claim 1, wherein said color filter comprises a transparent film having a polychromic transparent coating material thereon and arranged so as to be larger in size than said display patterns on said liquid crystal display element and smaller in size than said polarizing plates of said first polarizer.

3. A liquid crystal display device as claimed in claim 1, wherein said transflector is formed of a diffusion reflecting member and a thin metallic film coated on one surface of said diffusion reflecting member, said thin metallic film being semi-transparent and disposed in contact with said color filter.

4. A liquid crystal display device comprising: a front panel having displays indicating display contents on a surface of a transparent substrate; a plurality of light sources for causing illuminating light to be incident upon said front panel through an end surface thereof; a TN type liquid crystal display element having a plurality of display portions formed into a predetermined pattern; a background plate disposed between said liquid crystal display element and said front panel, said background plate being provided with a plurality of windows through which said display portions of said liquid crystal display element are viewed by a medium of said front panel, said background plate having a remaining portion shielded from light; a first polarizer and a second polarizer disposed so as to entirely cover said liquid crystal display element and having respective light absorbing axes parallel to each other; a color filter having colored portions formed into a pattern identical to said predetermined pattern of said display portions of said liquid crystal display element, said colored portions being larger than their associated windows on said background plate and slightly larger than their associated display portions of the liquid crystal display element; a transflector disposed in contact with said color filter; and an internal light source for illuminating said color filter through said transflector.

5. A liquid crystal display device as claimed in claim 4, further comprising a plurality of light sources for causing differently colored illuminating light to be incident upon said front panel through an end surface thereof and a means for changing lighting of said light sources.

* * * * *